Patented Nov. 11, 1930

1,781,225

UNITED STATES PATENT OFFICE

WILFRID GIBSON AND CHARLES ROYSTON HENSHAW, OF BLACKLEY, MANCHESTER, ENGLAND, ASSIGNORS TO IMPERIAL CHEMICAL INDUSTRIES LIMITED, OF WESTMINSTER, ENGLAND

PROCESS FOR THE PURIFICATION OF TRIARYL PHOSPHATES

No Drawing. Application filed October 23, 1929, Serial No. 401,976, and in Great Britain October 24, 1928.

Triaryl phosphate such as tricresyl and triphenyl phosphates prepared by the action of phosphorus oxychloride on the appropriate phenol in the presence of a suitable catalyst, obstinately retain small amounts of unchanged phenolic bodies which seriously impair their value as plasticizers in the cellulose ester industry.

Various methods have been patented for removing these free phenols. In German Patent No. 396,784, the crude product is washed with dilute caustic soda solution at 50° C.; in German Patent No. 401,872, it is agitated at elevated temperatures with animal charcoal, in German Patent No. 410,056, it is treated with toluenesulphonyl chloride. These methods either are cumbrous and troublesome, or do not give triaryl phosphates of the requisite purity.

We have now found that these unchanged phenolic bodies can readily be removed by treating the crude product of esterification with relatively small amounts of oleum containing about 20% free $SO_3$ for several hours at temperatures round about 100° C. On dilution, the ester separates as a heavy oil. It is run off, washed with water until free from traces of acid and further worked up by well-known methods.

The following example illustrates but does not limit our invention. The parts are by weight.

*Example.*—420 parts of the crude tricresyl phosphate, resulting from the interaction of cresylic acid and phosphorus oxychloride in the presence of one of the usual catalysts, are treated with 63 parts of 20% oleum. The temperature is raised to 100° C. and maintained there for four hours with rapid stirring. The product is then poured into 500 parts of cold water, the whole raised to 60° C. and stirred for twenty minutes.

The mixture now stands in a separating vessel for fifteen minutes and the lower layer of ester is then run into 500 parts of fresh water at 60° C. This treatment with water is repeated until the washings are no longer acid.

The final product is separated and dried, and either used directly, or further purified by distillation in vacuo if a water-white product is desired. Its cresol content is so small that the cooled liquid obtained by extracting a sample with 2% caustic soda solution at 60° C. gives only a very pale yellow coloration with a decinormal diazobenzene chloride solution.

What we claim and desire to secure by Letters Patent is:—

1. A process for the manufacture of a purified triaryl phosphate which comprises treating a crude triaryl phosphate with oleum of about 20% free sulphur trioxide content.

2. A process for the purification of a crude triaryl phosphate which comprises treating a crude triaryl phosphate with oleum of about 20% free sulphur trioxide content at a temperature of about 100° C.

3. A process for the purification of tricresyl phosphate which comprises treating a crude tricresyl phosphate with oleum of about 20% free sulphur trioxide content at a temperature of about 100° C.

In testimony whereof we affix our signatures.

WILFRID GIBSON.
CHARLES ROYSTON HENSHAW.